United States Patent [19]
Lewins et al.

[11] Patent Number: 5,640,469
[45] Date of Patent: Jun. 17, 1997

[54] SYSTEMS AND METHODS FOR PRODUCING HIGH-CONTRAST, INTENSITY EQUALIZED VISIBLE IMAGES

[75] Inventors: Lloyd J. Lewins, Marina Del Rey; Peter V. Messina, Santa Monica, both of Calif.

[73] Assignee: Hughes Electronics, Los Angeles, Calif.

[21] Appl. No.: 415,048

[22] Filed: Sep. 28, 1989

[51] Int. Cl.$^6$ ................................................ G06K 9/40
[52] U.S. Cl. .......................... 382/274; 382/169; 348/672; 348/673
[58] Field of Search .................................. 382/132, 169, 382/274, 300; 348/104, 602, 603, 651, 671, 672, 673; 345/130, 147, 20

[56] References Cited

U.S. PATENT DOCUMENTS

| | | | |
|---|---|---|---|
| 4,386,345 | 5/1983 | Narveson et al. | 345/20 |
| 4,589,022 | 5/1986 | Prince et al. | 348/602 |
| 4,610,026 | 9/1986 | Tabata et al. | 382/300 |
| 5,060,081 | 10/1991 | Shimura | 382/169 |
| 5,063,607 | 11/1991 | Fitzhenry et al. | 382/274 |

OTHER PUBLICATIONS

Xoe et al, "Toward the Unification of Three Visual Laws and Two Visual Models in Brightness Perception", IEEE Transactions on Systems, Man, and Cybernetics, vol. 19, No. 2, Mar./Apr. 1989.

*Primary Examiner*—Leo Boudreau
*Assistant Examiner*—Chris Kelley
*Attorney, Agent, or Firm*—Leonard A. Alkov; Wanda K. Denson-Low

[57] ABSTRACT

Systems and methods for improving the intensity equalization of image data obtained with systems that perceive images with energy sources other than visible light includes a sensor for such data; a converter for transforming the image data from analog form to digital form; a converter for transforming the digital data into black-and-white images containing a predetermined, desired number of gray shades; an intensity equalizer that compensates for the logarithmic effect of visual images on a human eye; an intensity equalizer that compensates for the non-linear effect of the display device for the data; and a converter for transforming the digital intensity-equalized black-and-white image data into analog form for display on a device such as a conventional CRT.

7 Claims, 1 Drawing Sheet

SYSTEMS AND METHODS FOR PRODUCING HIGH-CONTRAST, INTENSITY EQUALIZED VISIBLE IMAGES

BACKGROUND OF THE INVENTION

1. Field of the Invention

This invention relates to systems and methods for producing visible images having good intensity equalization and contrast to the human eye from data obtained with imaging systems that utilize energy sources other than visible light. Such systems include, for example, radar systems, sonar systems, X-ray systems, and infrared, particularly far-looking infrared systems.

2. Background of the Invention

In the past, systems for improving the intensity equalization, contrast, and brightness of visible images for viewing by the human eye derived from data obtained with imaging systems such as infrared systems, or others that use energy sources other than visible light, compensated for the non-linearity of CRT displays of such images with a transfer function based solely upon the relationship between the voltage of the data input to the display device and the corresponding brightness of the resulting output. Such compensation methods do not take account of the logarithmic behavior of the human eye in perceiving CRT displays of such images. A need for a system that compensates for this logarithmic behavior of the human eye exists, and has, until now, remained unsolved.

SUMMARY OF THE INVENTION

This invention provides systems and methods for improving intensity equalization of image data obtained with systems that perceive images with energy sources other than visible light. Such systems include radar systems, sonar systems, X-ray systems and infrared systems, particularly far-looking infrared systems. Such infrared systems are utilized to scan scenes by day and by night, and in virtually all weather conditions, including conditions of extreme variations in temperature.

The systems of this invention include means for sensing data representative of an image with an energy source other than visible light under widely varying conditions; means for converting, as necessary, the image data from analog form to digital form; means for converting the digital data into black-and-white images containing a predetermined, desired number of gray shades; means for equalizing the intensity of the data by compensating for the logarithmic effect of visual images on the human eye; means for equalizing the intensity of the black-and-white image data by compensating for the nonlinear effect of the display device for the data; means for converting the digitial, intensity-equalized black-and-white image data into analog form; and means for delivering the analog form data to a display such as a conventional CRT display.

In preferred embodiments, the sensing means can include a plurality of parallel scanning means which produce parallel scanned image data. Such systems may also include means for converting the parallel scanned, digital data into raster scanned digital data; means for interpolating two or more adjacent lines of raster-scanned digital data to generate additional lines, thus converting the raster-scanned digital data from a given number of lines to a larger number of lines. Where such systems perceive images with heat energy, measured in units of temperature, the systems may also include means for converting, by determining the optimum mapping of, interpolated, raster-scanned digital data from high dynamic range thermal images into black-and-white images, preferably using a modified version of a histogram equalization means. Such a histogram equalization means is disclosed in the text entitled, "Digital Image Processing," by R. C. Gonzalez and P. Wintz, published in May, 1987, by Addison Wesley, at page 146.

In preferred embodiments, the intensity equalization means converts image data, whose intensity N at each point with coordinates x, y is $N_{x,y}$, where N is intensity measured in units other than units of visible light, and is in the range N (minimum) to N (maximum), to a new image with an equalized intensity at each corresponding point called $P_{x,y}$, where P is also in the range N (minimum) to N (maximum). The conversion is made in accordance with the following conversion formula (1), (2), (3) and (4):

$$p_{x,y} = \frac{\beta^{-n_{x,y}} - 1}{\beta^{-1} - 1} \quad (1)$$

$$n_{x,y} = \frac{N_{x,y} - N_{min}}{N_{max} - N_{min}} \quad (2)$$

and $$P_{x,y} = \frac{P_{x,y} - N_{min}}{N_{max} - N_{min}} \quad (3)$$

and $$\beta = B_{min}/B_{max} \quad (4)$$

where $B_{min}$ is the minimum brightness of the display device for the images and $B_{max}$ is the maximum brightness of the same display device. This transfer function provides the intensity equalization necessary to take account of the logarithmic behavior of the human eye.

After this equalization, the intensity at each point P with coordinates x,y is corrected to the corresponding intensity $M_{x,y}$ at each point with coordinates x,y to compensate for the non-linearity of CRT displays of such images in accordance with the following conversion formula:

$$m_{x,y} = (p_{x,y})^{\frac{1}{\gamma}} \quad (5)$$

where $$m_{x,y} = \frac{M_{x,y} - N_{min}}{N_{max} - N_{min}} \quad (6)$$

In these formulas, gamma ($\gamma$) has a known value for the display system used and defines the relationship between display brightness (B), and the voltage input to the display (E) in accordance with the following formula:

$$\frac{B - B_{min}}{B_{max} - B_{min}} = \left(\frac{E - E_{min}}{E_{max} - E_{min}}\right)^{\gamma} \quad (7)$$

In these systems, brightness includes background brightness for the display system from sources such as reflections or transmissions of extraneous light. The term Beta ($\beta$) can be approximated by a constant, or if the system includes an automatic brightness control in the display means, beta can be set to a known brightness ratio.

BRIEF DESCRIPTION OF THE DRAWING

The invention can better be understood by reference to the drawing, which shows, in block diagram form, a preferred embodiment of the systems and methods of this invention.

DESCRIPTION OF THE PREFERRED EMBODIMENT

Figure 1:
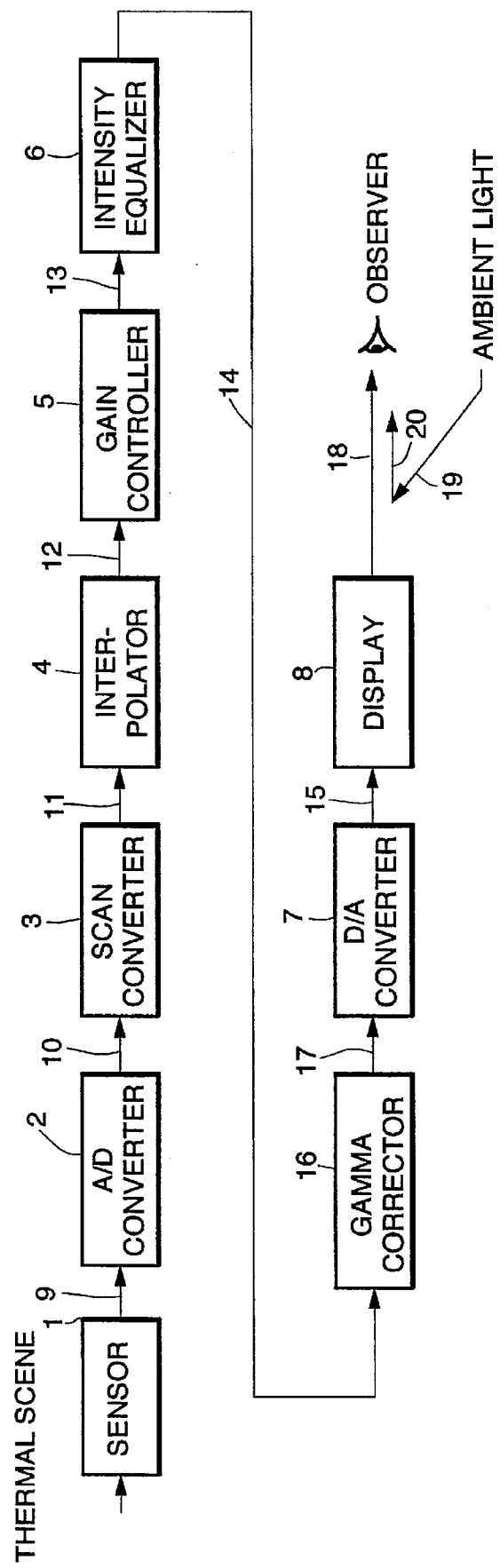

FIG. 1 shows a block function diagram of a preferred embodiment of the systems and of the methods of this invention. Such a system can be part of a forward-looking infrared system mounted in a high-performance jet plane used for scanning both the sky and the terrain that the plane traverses. In FIG. 1, sensor 1 receives image data from an infrared scanning system having a plurality of parallel scanning devices (not shown) and outputs a parallel, scanned thermal image of each scene in the format of 320 lines by 752 pixels. The dynamic range of the sensor is programmable, and is preferably programmed to a range of about 100° C.

The parallel scanned thermal image scene data passes, on path 9, to analog-to-digital converter (ADC) 2 which digitizes the thermal image, preferably into a nine-digit format. This digitized data passes on path 10 to scan converter 3, which converts the parallel scanned thermal image into a raster scanned image. The raster scanned image data passes from converter 3 on path 11 to interpolator 4 which interpolates between two adjacent lines of data to generate a third line, thus forming a 480-line data image from a 320-line data image. This interpolated data passes from interpolator 4 on path 12 to automatic gain controller 5.

Gain controller 5 determines the optimum mapping or conversion of the data from high dynamic range thermal images into low dynamic range black and white images containing 256 gray shades.

The data from automatic gain controller 5 passes on path 13 to intensity equalization block 6. Block 6 converts the intensity $N_{x,y}$ at each point, defined by coordinates x, y, to a new image whose intensity at each point is $P_{x,y}$. Both N and P are in the range N (minimum) to N (maximum), in accordance with expressions (1), (2), (3) and (4) above.

The intensity equalized data passes on path 14 to gamma corrector 16, where the digital, intensity-equalized image data having the intensity $P_{x,y}$ at each point is converted to data having the intensity $M_{x,y}$ at each point in accordance with the conversion formulas (3), (5) and (6) above. The intensity-equalized data then passes from gamma corrector 16 on path 17 to digital-to-analog converter 7, where the digitized intensity-equalized data is converted from digital-to-analog form. The analog data then passes on path 15 from DAC 7 to display means 8, which is typically a CRT display, for viewing by the human eye. The human eye sees the image transmitted on path 18. The image can be further compensated to take account of ambient light striking the display on path 19, and then reflecting to the human observer's eye on path 20.

What is claimed is:

1. A system for improving the intensity equalization of image data obtained with systems that perceive images with energy sources other than visible light comprising: means for sensing data representative of an image with an energy source other than light; means for converting, as necessary, the image data from analog form to digital form; means for converting the digital data into black-and-white images containing a predetermined, desired number of gray shades; means for equalizing the intensity of the data by compensating for the logarithmic effect of visual images on the human eye; means for equalizing the intensity of the black-and-white image data by compensating for the non-linear effect of the display device of the data; means for converting the digital, intensity equalized black-and-white image data into analog form; and means for delivering the analog form data to a display for said image data; wherein said means for equalizing the intensity of the data by compensating fro the logarithmic effect of visual images on a human eye comprises means for correcting the intensity N at each point with coordinates x,y to a corresponding intensity at each point P with coordinates x,y in accordance with the following formulas:

$$p_{xy} = \frac{\beta^{-n_{x,y}} - 1}{\beta^{-1} - 1} \quad (1)$$

$$n_{xy} = \frac{N_{xy} - N_{min}}{N_{max} - N_{min}} \quad (2)$$

and $$p_{xy} = \frac{P_{xy} - N_{min}}{N_{max} - N_{min}} \quad (3)$$

$$\beta = B_{min}/B_{max}. \quad (4)$$

2. The system of claim 1 further comprising means for converting said digital form data into raster-scanned digital form data.

3. The system of claim 2 further comprising means for interpolating two or more adjacent lines of said raster-scanned digital data to generate additional lines.

4. The system of claim 3 wherein said means for equalizing the intensity of the black-and-white image data comprises histogram-equalization means.

5. The system of claim 1 wherein said display means comprises a CRT display.

6. A method for improving the intensity equalization of image data obtained by using energy sources other than visible light comprising sensing said data with an energy source other than light; converting, as necessary, the image data from analog form to digital form; converging the digital data into black-and-white image data containing a predetermined, desired number of gray shades; equalizing the intensity of the data by compensating for the logarithmic effect of visual images on a human eye; equalizing the intensity of the black-and-white image data by compensating for the non-linear effect of the display device of the data; converting the digital, intensity-equivalent black-and-white image data into analog form; and displaying said analog form data on a display means wherein said means for equalizing the intensity of the data by compensating for the logarithmic effect of visual images on a human eye comprising means for correcting the intensity N at each point with coordinates x,y to a corresponding intensity at each point P with coordinates x,y in accordance with the following formulas:

$$p_{x,y} = \frac{\beta^{-n_{x,y}} - 1}{\beta^{-1} - 1} \quad (1)$$

$$n_{x,y} = \frac{N_{x,y} - N_{min}}{N_{max} - N_{min}} \quad (2)$$

and $$p_{x,y} = \frac{P_{x,y} - N_{min}}{N_{max} - N_{min}} \quad (3)$$

$$\beta = B_{min}/B_{max}. \quad (4)$$

7. The system of claim 1 wherein said means for equalizing the intensity of the data by compensating for the non-linear effect of the display device of the data comprises means for converting the intensity at each point P with coordinates x,y to the corresponding intensity M at each point with coordinates x,y in accordance with the following conversion formulas:

$$p_{x,y} = \frac{P_{x,y} - N_{min}}{N_{max} - N_{min}} \quad (3)$$

$$m_{x,y} = (p_{x,y})^{\frac{1}{\gamma}} \quad (5)$$

$$m_{x,y} = \frac{M_{x,y} - N_{min}}{N_{max} - N_{min}} \quad (6)$$

$$\frac{B - B_{min}}{B_{max} - B_{min}} = \left( \frac{E - E_{min}}{E_{max} - E_{min}} \right)^{\gamma} \quad (7)$$

* * * * *